United States Patent
Gale et al.

(10) Patent No.: US 6,674,180 B2
(45) Date of Patent: Jan. 6, 2004

(54) POWER SUPPLY FOR A HYBRID ELECTRIC VEHICLE

(75) Inventors: Allan Roy Gale, Livonia, MI (US); Michael W. Degner, Novi, MI (US); Paul Raymund Nicastri, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 09/682,744

(22) Filed: Oct. 12, 2001

(65) Prior Publication Data

US 2003/0071466 A1 Apr. 17, 2003

(51) Int. Cl.$^7$ .............................................. H01M 10/46
(52) U.S. Cl. .............................. 290/7; 320/117; 322/28
(58) Field of Search ................................ 322/28; 290/7, 290/36 A; 320/164, 162, 118, 117, 121

(56) References Cited

U.S. PATENT DOCUMENTS

| | | | |
|---|---|---|---|
| 4,136,311 A | 1/1979 | Scheidler | 322/28 |
| 4,604,528 A * | 8/1986 | Norton | 307/9.1 |
| 4,814,631 A | 3/1989 | Jackson | 307/53 |
| 4,845,465 A * | 7/1989 | Kruse et al. | 340/468 |
| 5,121,046 A | 6/1992 | McCullough | 320/16 |
| 5,184,058 A | 2/1993 | Hesse et al. | 320/4 |
| 5,260,637 A | 11/1993 | Pizzi | 320/6 |
| 5,373,195 A | 12/1994 | De Doncker et al. | 307/45 |
| 5,498,950 A | 3/1996 | Ouwerkerk | 320/18 |
| 5,504,415 A | 4/1996 | Podrazhansky et al. | 320/18 |
| 5,546,295 A | 8/1996 | Prete et al. | 363/17 |
| 5,561,360 A | 10/1996 | Ayres et al. | 320/14 |
| 5,589,743 A | 12/1996 | King | 318/139 |
| 5,594,634 A | 1/1997 | Rajashekara et al. | 363/98 |
| 5,610,499 A | 3/1997 | Rogers | 322/25 |
| 5,710,699 A | 1/1998 | King et al. | 363/132 |
| 5,712,568 A | 1/1998 | Flohr et al. | 324/434 |
| 5,717,310 A | 2/1998 | Sakai et al. | 320/15 |
| 5,723,956 A | 3/1998 | King et al. | 318/139 |
| 5,734,258 A | 3/1998 | Esser | 323/224 |
| 5,803,215 A | 9/1998 | Henze et al. | 191/2 |
| 5,889,385 A | 3/1999 | Podrazhansky et al. | 320/130 |
| 5,903,449 A | 5/1999 | Garrigan et al. | 363/41 |
| 5,905,360 A | 5/1999 | Ukita | 320/118 |
| 5,947,093 A | 9/1999 | Ward | 123/598 |
| 6,023,109 A | 2/2000 | Yang | 307/81 |
| 6,031,355 A * | 2/2000 | Rich | 320/117 |
| 6,043,567 A | 3/2000 | Uhler et al. | 307/10.1 |
| 6,044,922 A | 4/2000 | Field | 180/65.2 |
| 6,075,331 A | 6/2000 | Ando et al. | 318/376 |
| 6,140,799 A | 10/2000 | Thomasson | 320/117 |
| 6,154,381 A | 11/2000 | Kajouke et al. | 363/65 |
| 6,157,165 A | 12/2000 | Kinoshita et al. | 320/116 |
| 6,166,934 A | 12/2000 | Kajouke et al. | 363/65 |
| 6,194,875 B1 | 2/2001 | Takimoto et al. | 320/164 |
| 6,204,652 B1 | 3/2001 | Albou et al. | 323/284 |
| 6,230,496 B1 | 5/2001 | Hofmann et al. | 60/706 |
| 6,239,996 B1 | 5/2001 | Perreault et al. | 363/89 |
| 6,265,851 B1 | 7/2001 | Brien et al. | 320/162 |
| 6,268,666 B1 | 7/2001 | Bhowmik | 307/72 |
| 6,275,004 B1 | 8/2001 | Tamai et al. | 320/118 |
| 6,313,637 B1 | 11/2001 | Iino et al. | 324/434 |
| 6,314,006 B1 | 11/2001 | Berberich et al. | 363/25 |

* cited by examiner

Primary Examiner—Nicholas Ponomarenko
(74) Attorney, Agent, or Firm—Artz & Artz; Carlos L. Hanze

(57) ABSTRACT

An electrical system (12) is provided for an automotive vehicle (10) having a first power source (14) with a first positive terminal (16) and first negative terminal (18). A second power source (20) having a second positive terminal (22) and a second negative terminal (24) is also provided. A common electrical node $N_2$ is coupled to the first negative terminal and the second positive terminal. A first load (26) is coupled between the first positive terminal and the second node $N_2$. A second load (28) is coupled between the common node $N_2$ and the second negative terminal (24).

17 Claims, 1 Drawing Sheet

POWER SUPPLY FOR A HYBRID ELECTRIC VEHICLE

BACKGROUND OF INVENTION

The present invention relates generally to hybrid electric vehicles, and more particularly, to a power supply for a hybrid electric vehicle.

Currently, the automotive industry is preparing to convert from a 14 volt electrical system to 42 volts to facilitate the increasing demand for electrical power. Various manufacturers of electrical components have and are currently designing 42 volt systems.

Integrated starter/motors or integrated starter/generators are also being proposed for automotive vehicles. Current plans employ the 42 volt system for the operation of the integrated starter/generators. However, during start up, low voltage and high currents can occur. The low voltage and high current may change the performance and decrease the life of electrical components within the electrical system. Components that may be adversely affected may have to be designed to be more robust. This may increase the cost of the system and the vehicle.

It would therefore be desirable to provide an electrical architecture suitable for powering an integrated starter/generator while still allowing the system to utilize current 42 volt components.

SUMMARY OF INVENTION

The present invention provides an improved electrical system suitable for use in a hybrid electric vehicle. The present invention provides an electrical system for an automotive vehicle having a first power source with a first positive terminal and first negative terminal. A second power source having a second positive terminal and a second negative terminal is also provided. A common electrical node $N_2$ is coupled to the first negative terminal and the second positive terminal. A first load is coupled between the first positive terminal and the second node $N_2$. A second load is coupled between the common node $N_2$ and the second negative terminal.

In a further aspect of the invention, a method for operating an electrical system for an automotive vehicle comprises:

operating a first load with a first power source;

operating a second load with a second power source;

forming a series combination of said first power source and said second power source; and operating an inverter with said series combination.

One advantage of the invention is that during cold operating conditions current draw on the system will not be as great as in a single power source system.

Other advantages and features of the present invention will become apparent when viewed in light of the detailed description of the preferred embodiment when taken in conjunction with the attached drawings and appended claims.

DETAILED DESCRIPTION

Figure 1:
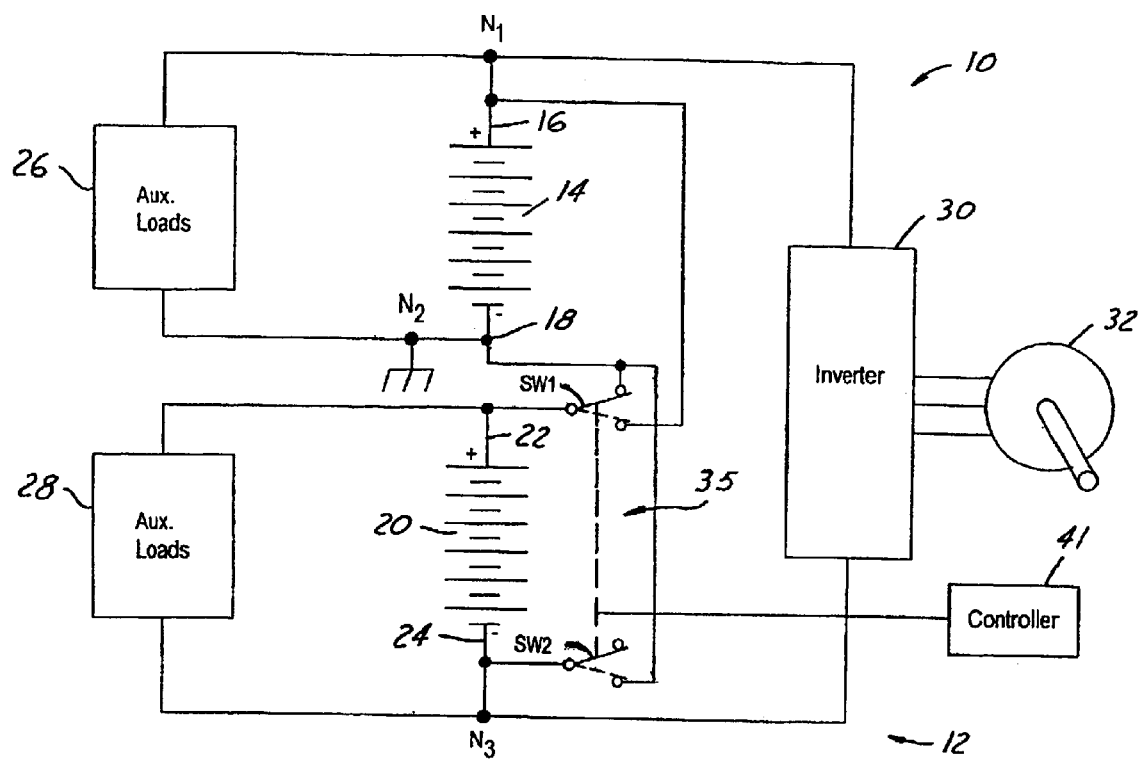
FIG. 1 is a schematic view of an electrical system for an automotive vehicle according to the present invention.

The following description is provided with respect to a hybrid electrical vehicle. However, those skilled in the art will recognize that this system may be used with other types of electrical or hybrid electric vehicles.

Referring now to the FIGURE, a hybrid electrical vehicle 10 is illustrated having an electrical system 12. Electrical system 12 has a first power source 14 having a positive terminal 16 and a negative terminal 18. Electrical system 12 also has a second power source 20 having a positive terminal 22 and a negative terminal 24. First power source 14 and second power source 20 are preferably direct current batteries generating 42 volts. Those skilled in the art, however, will recognize that various other voltages may be suitable. Also, first power source 14 and second power source 20 are illustrated as separate components. However, each of the power sources may be included physically in one box or location with three or four terminals.

First power source 14 may be coupled to a first auxiliary load 26 and second power source 20 may be coupled to power second auxiliary loads 28. Auxiliary loads 26 and 28 may be various devices and components located throughout the vehicle including power steering systems, air conditioning systems, power windows, audio equipment, heated seats, and other devices. First positive terminal 16 is coupled to a common node $N_1$ which in turn is coupled to one side of auxiliary load 26. Negative terminal 18 is coupled to a second node $N_2$. Second node $N_2$ is also coupled to auxiliary load 26. Node $N_2$ is also coupled to the positive terminal 22 of second power source 20 and auxiliary load 28. Negative terminal 24 is coupled to node $N_3$. Node $N_3$ is also coupled to auxiliary load 28.

Node $N_2$ may also be referred to as the chassis ground. That is, the chassis of the automobile may have its metal conducting loads electrically connected to node $N_2$. This allows both auxiliary load 26 and auxiliary load 28 to be operated by a single battery. Each auxiliary load 26 thus operates on a 42 volt source because the potential difference between the battery terminals is 42 volts in the present example.

An inverter 30 is coupled to the series combination of first power source 14 and second power source 20. That is, inverter 30 is coupled to node $N_1$ and node $N_3$ or the first positive terminal 16 and the second negative terminal 24. Inverter 30 is used to operate motor generator 32 that is coupled thereto. Motor generator 32 may also be referred to in the art as an integrated starter/alternator or starter/alternator. By coupling inverter 30 between nodes $N_1$ and $N_3$, inverter 30 operates on the combined voltage of power source 14 and power source 20. In the present example, inverter may thus operate on 84 volts.

In an alternative embodiment of the present invention, a switch circuit 35 having switches SW1 and SW2 and a switch controller 41 may be coupled to the circuit. Switches SW1 and SW2 open and close causing the coupling and decoupling of auxiliary load 28 to node $N_2$ while closing and opening an electrical path to auxiliary load 28. That is, switch circuit 35 causes batteries 14, 20 to switch from serial to parallel which may be advantageous during certain operating conditions. Switch SW1 couples terminal 22 between chassis ground and terminal 116. Switch SW2 couples between negative terminal 24 of battery 22 to chassis ground of node $N_1$. In operation during a regular mode (non-motoring), switches SW1 and SW2 are shown in the solid position so that the switches are in series. Controller 41 simultaneously controls the operation of switches SW1 and SW2 By operating switches SW1 and SW2 in a non-motoring mode, first power source 14 and second power source 20 operate in parallel shown in dashed lines. That is, controller 41 senses a predetermined condition such as a non-motoring mode and operates the switches. Controller 41 controls the switching of switches simultaneously. Of course, those skilled in the art will recognize various placements and embodiments of switches will allow the changing from a series to parallel system.

While particular embodiments of the invention have been shown and described, numerous variations and alternate embodiments will occur to those skilled in the art. Accordingly, it is intended that the invention be limited only in terms of the appended claims.

What is claimed is:

1. An electrical system for an automotive vehicle comprising:
   a first power source having a first positive terminal and a first negative terminal;
   a second power source having a second positive terminal and a second negative terminal;
   a common electrical node coupled to said first negative terminal and said second positive terminal;
   a first load coupled between said first positive terminal and said common node; and
   a second load coupled between said common node and said second negative terminal; and
   an inverter coupled to said first positive terminal and said second negative terminal.

2. An electrical system for an automotive vehicle as recited in claim 1 further comprising an inverter motor generator coupled to said inverter.

3. An electrical system for an automotive vehicle as recited in claim 1 further comprising an inverter coupled to a series combination of said first power source and said second power source.

4. An electrical system for an automotive vehicle as recited in claim 1 wherein said common node comprises a chassis ground.

5. An electrical system for an automotive vehicle as recited in claim 1 wherein said first power source comprises a 42 volt source.

6. An electrical system for an automotive vehicle as recited in claim 1 wherein said second power source comprises a 42 volt source.

7. An electrical system for an automotive vehicle as recited in claim 1 wherein said first power source has a first voltage rating and said second power source has a second voltage rating equal to said first voltage rating.

8. An electrical system for an automotive vehicle as recited in claim 1 further comprising a switch and a controller, said switch electrically coupling said first power source and said second power source in parallel.

9. An automotive vehicle comprising:
   a first power source having a first positive terminal and a first negative terminal;
   a second power source having a second positive terminal and a second negative terminal;
   a chassis ground coupled to said first negative terminal and said second positive terminal;
   a first load coupled between said first positive terminal and said chassis ground;
   a second load coupled between said chassis ground and said second negative terminal;
   an inverter coupled to said first positive terminal and said second negative terminal; and
   an integrated motor generator coupled to said inverter.

10. An automotive vehicle as recited in claim 9 wherein said first power source comprises a 42 volt source.

11. An automotive vehicle as recited in claim 9 wherein said second power source comprises a 42 volt source.

12. An automotive vehicle as recited in claim 9 wherein said first power source has a first voltage rating and said second power source has a second voltage rating equal to said first voltage rating.

13. An automotive vehicle as recited in claim 9 further comprising a switch circuit and a controller, said switch circuit electrically coupling said first power source and said second power source in parallel.

14. A method of operating an electrical system for an automotive vehicle comprising:
   operating a first load with a first power source;
   operating a second load with a second power source;
   forming a series combination of said first power source and said second power source; and
   operating an inverter with said series combination.

15. A method as recited in claim 14 further comprising forming a common node between said first power source, said second power source, said first load and said second load.

16. A method as recited in claim 14 further comprising switching said series combination to a parallel combination in response to a predetermined condition.

17. A method as recited in claim 16 wherein said predetermined condition comprises a non-motoring mode.

* * * * *